United States Patent
Wänstedt et al.

(10) Patent No.: US 9,100,914 B2
(45) Date of Patent: Aug. 4, 2015

(54) ADAPTATION OF DRX CYCLE BASED ON KNOWLEDGE OF SCHEDULING INFORMATION AND SYSTEM LOAD

(75) Inventors: Stefan Wänstedt, Luleå (SE); Min Wang, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 344 days.

(21) Appl. No.: 13/519,156

(22) PCT Filed: May 15, 2012

(86) PCT No.: PCT/SE2012/050522
§ 371 (c)(1),
(2), (4) Date: Jun. 26, 2012

(87) PCT Pub. No.: WO2013/074015
PCT Pub. Date: May 23, 2013

(65) Prior Publication Data
US 2013/0308507 A1   Nov. 21, 2013

Related U.S. Application Data

(60) Provisional application No. 61/560,524, filed on Nov. 16, 2011.

(51) Int. Cl.
*H04W 52/02* (2009.01)

(52) U.S. Cl.
CPC ...... *H04W 52/0216* (2013.01); *H04W 52/0232* (2013.01)

(58) Field of Classification Search
CPC ................ H04W 52/02–52/0258; Y02B 60/50
USPC .......................................................... 370/311
See application file for complete search history.

(56) References Cited

U.S. PATENT DOCUMENTS

| | | | |
|---|---|---|---|
| 2008/0186892 A1 | 8/2008 | Damnjanovic | |
| 2010/0208660 A1 | 8/2010 | Ji | |
| 2011/0128865 A1* | 6/2011 | Doppler et al. | 370/252 |
| 2011/0211466 A1* | 9/2011 | Kazmi | 370/252 |
| 2013/0150018 A1* | 6/2013 | Su et al. | 455/419 |
| 2013/0294307 A1* | 11/2013 | Johansson et al. | 370/311 |

FOREIGN PATENT DOCUMENTS

EP   1971166 A1   9/2008

* cited by examiner

*Primary Examiner* — Pao Sinkantarakorn
(74) *Attorney, Agent, or Firm* — Murphy, Bilak & Homiller, PLLC

(57) ABSTRACT

Methods and arrangements for enabling reduced battery consumption in a mobile terminal. A method involves determining a scheduling priority associated with the mobile terminal and/or a load level in a cell associated with the mobile terminal. The method further involves determining whether a criterion is fulfilled based on the determined scheduling priority and/or load level, where the criterion is associated with an anticipated waiting time until being scheduled. If the criterion is fulfilled the DRX settings of the mobile terminal are adjusted, such that said settings are in accordance with the anticipated waiting time associated with the criterion. Thereby, reduced battery consumption in the mobile terminal is enabled.

27 Claims, 9 Drawing Sheets

| Candidate settings: | Criterion: | Anticipated waiting time: |
|---|---|---|
| DRX settings 1 | a ≤ load | x1 |
| DRX settings 2 | b ≤ load < a;   prio ≤ c | x2 |
| DRX settings 3 | b ≤ load < a;  c < prio ≤ d | x3 |
| DRX settings 4 | e ≤ load < b;  c < prio ≤ d | x4 |
| ⋮ | ⋮ | ⋮ |

ADAPTATION OF DRX CYCLE BASED ON KNOWLEDGE OF SCHEDULING INFORMATION AND SYSTEM LOAD

RELATED APPLICATIONS

The present application is the U.S. national stage entry under 35 U.S.C. §371 of international patent application serial no. PCT/SE2012/050522, filed 15 May 2012, which claimed the benefit of U.S. provisional application Ser. No. 61/560,524, filed 16 Nov. 2011.

TECHNICAL FIELD

The present invention relates generally to the control of devices in wireless communication networks, and more particularly relates to techniques for controlling the use of discontinuous reception (DRX) operation in wireless communication devices.

BACKGROUND

As wireless technologies become more versatile and offer higher data rates, more and more mobile devices are deployed. Earlier visions of 50 billion wireless connections are fast becoming reality, while predictions of more than 500 billion connections are becoming more and more likely to be fulfilled.

In addition, mobile devices are more powerful than before. People can easily program and install new applications to their smart-phones according to their preferences. However, these capabilities and advanced features like a big screen, large memory and powerful CPU consume a lot of energy. Long battery lifetime for a mobile terminal (a "user equipment" or "UE" in the terminology of the $3^{rd}$-Generation Partnership Project, or 3GPP) is an important feature to device users—thus improved conservation of the battery's energy is required for the advancement of the UE terminal.

To satisfy the need for providing reduced power consumption and thus longer active UE time, the Long-Term Evolution (LTE) specifications developed by 3GPP include a set of functionalities to make UEs sleep when there is no need to listen to the control channel, thus extending the useful battery life. These functionalities are described in "3rd Generation Partnership Project; Technical Specification Group Radio Access Network; Evolved Universal Terrestrial Radio Access (E-UTRA); Medium Access Control (MAC) protocol specification (Release 9)," 3GPP TS 36.321, v. 9.4.0, November 2009.

According to said 3GPP specification, a feature called Discontinuous Reception (DRX) allows the UE to monitor the Physical Downlink Control Channel (PDCCH) only during certain time intervals specified by higher layers, for example RRC signaling, instead of monitoring the PDCCH during every transmit-time-interval (TTI). Thereby, the UE can dramatically decrease the power consumption by turning off unused circuitry during the inactive intervals. The DRX settings may provide benefits both in downlink and uplink. FIG. 1 illustrates a network node 102 serving a number of mobile terminals 104, for which the DRX functionality may be used. The network node 102 and the mobile terminals 104 in FIG. 1 are associated with a cell 106, served by the network node 102.

Below, the existing DRX functionality will be described in further detail. The DRX functionality in RRC_CONNECTED state specifies two DRX cycles for each UE, namely: the long DRX cycle and the short DRX cycle. The long DRX cycle is typically used. The short DRX cycle is an optional feature, and is configured for periods during which increased connectivity between the UE and the wireless network is needed. Within each DRX cycle, there is an active period and an inactive period. Within each DRX cycle, a UE is required to only listen to control channels for a number of consecutive PDCCH sub-frames specified by a timer called "On Duration Timer", and can thus turn off radio-frequency (RF) circuits when this timer expires (and the inactive period begins), until the cycle begins again. When more frequent data activity is detected in downlink or uplink, the radio base station (RBS) ("evolved NodeB" or "eNB" in LTE terminology) can trigger the short DRX cycle for the UE. The transitions between long DRX cycle and short DRX cycle are trigged directly by the RBS, or driven by a predefined timer. FIG. 2 illustrates the representation of a DRX cycle comprising an active 202 and an inactive period 204. For each cycle, the terminal turns on RF only for the active "on" duration period 202, also indicated as "UE awake" in FIG. 2.

The settings for the DRX cycle can depend on the prior knowledge of traffic type. For frequent traffic types, like AMR VoIP, 20 ms of short DRX cycle fits to the VoIP frame interval. However, for traffic with a high sporadic behavior, a long DRX cycle is preferred during the periods when the traffic has low activity.

Besides the On Duration timer and the short and long cycle timers, there are also a number of other timers which may configure the active time periods for a UE:

Inactivity Timer specifies the periods during which a UE shall monitor PDCCH after successfully decoding a PDCCH assignment indicating an UL or DL data transfer for this UE.
Retransmission Timer (both UL and DL), will be triggered when a HARQ retransmission is expected.
HARQ RTT Timer (Hybrid Automatic Repeat reQuest; Round-Trip delay Time), specifies the minimum amount of subframe(s) before a DL HARQ retransmission is expected by the UE.
Timer for SR pending (Scheduling Request), if there is SR pending, UE has to listen to PDCCH until the pending SR is cancelled. When an SR is triggered, it shall be considered as pending until it is cancelled. Pending SR(s) shall be cancelled when a MAC PDU including BSR is assembled or the allocated grants can accommodate all pending data available for transmission.

As a summary, according to the specification 3GPP TS 36.321, when a DRX cycle is configured, the (UE) Active Time includes the time while on DurationTimer or drx-Inactivity Timer or drx-Retransmission Timer is running; or a Scheduling Request is sent on PUCCH and is pending; or an uplink grant for a pending HARQ retransmission can occur and there is data in the corresponding HARQ buffer; or a PDCCH indicating a new transmission addressed to the C-RNTI (Cell Radio Network Temporary Identifier) of the UE has not been received after successful reception of a Random Access Response for the preamble not selected by the UE.

When DRX is configured, the UE shall for each subframe:
if a HARQ RTT Timer expires in this subframe and the data in the soft buffer of the corresponding HARQ process was not successfully decoded:
    start the drx-Retransmission Timer for the corresponding HARQ process.
if a DRX Command MAC control element is received:
    stop on DurationTimer;
    stop drx-InactivityTimer.

if drx-InactivityTimer expires or a DRX Command MAC control element is received in this subframe:
    if the Short DRX cycle is configured:
        start or restart drxShortCycleTimer;
        use the Short DRX Cycle.
    else:
        use the Long DRX cycle.
    if drxShortCycleTimer expires in this subframe:
        use the Long DRX cycle.
If the Short DRX Cycle is used and [(SFN*10)+subframe number] modulo (shortDRX-Cycle)=(drxStartOffset) modulo (shortDRX-Cycle); or
if the Long DRX Cycle is used and [(SFN*10)+subframe number] modulo (longDRX-Cycle)=drxStartOffset:
    start on DurationTimer.
during the Active Time, for a PDCCH-subframe, if the subframe is not required for uplink transmission for half-duplex FDD UE operation and if the subframe is not part of a configured measurement gap:
    monitor the PDCCH;
if the PDCCH indicates a DL transmission or if a DL assignment has been configured for this subframe:
    start the HARQ RTT Timer for the corresponding HARQ process;
    stop the drx-Retransmission Timer for the corresponding HARQ process.
if the PDCCH indicates a new transmission (DL or UL):
    start or restart drx-InactivityTimer.
when not in Active Time, type-0-triggered SRS [2] shall not be reported.
if CQI masking (cqi-Mask) is setup by upper layers:
when on DurationTimer is not running, CQI/PMI/RI/PTI on PUCCH shall not be reported.
else:
    when not in Active Time, CQI/PMI/RI/PTI on PUCCH shall not be reported

SUMMARY

It would be desirable to extend the battery lifetime in mobile terminals, e.g. to improve user satisfaction. That is, it would be desirable to extend the time during which a UE may be actively used by a user after having fully charged the battery, before the battery becomes discharged. It is an object of the invention to reduce battery consumption in a mobile terminal, and thus enable extended battery lifetime.

According to a first aspect, a method is provided in a network node (which may be either a base station or a mobile terminal) in a wireless communication system, for enabling reduced battery consumption in a mobile terminal. The method involves determining a scheduling priority associated with the mobile terminal and/or a load level in a cell associated with the mobile terminal. Further, it is determined whether a criterion is fulfilled based on the determined scheduling priority and/or load level, where the criterion is associated with an anticipated waiting time until being scheduled. If the criterion is fulfilled, the DRX settings of the mobile terminal is adjusted, such that said settings are in accordance with the anticipated waiting time associated with the criterion.

According to a second aspect, an arrangement is provided in a network node, for enabling reduced battery consumption in a mobile terminal. The arrangement comprises a determining unit, adapted to determine a scheduling priority associated with the mobile terminal and/or a load level of a cell associated with the mobile terminal. The determining unit is further adapted to determine whether a criterion is fulfilled based on the determined scheduling priority and/or load level, the criterion being associated with an anticipated waiting time until being scheduled. The arrangement further comprises an adjusting unit, which is adapted to, if the criterion is fulfilled, adjust the DRX settings of the mobile terminal, such that said settings are in accordance with the anticipated waiting time associated with the criterion.

The above method and arrangement enable reduced battery consumption in the mobile terminal, which leads to prolonged battery lifetime. Further, the suggested technology enables differentiated power consumption for different services.

The above method and arrangement may be implemented in different embodiments. For example, the adjustment of the DRX settings may involve adjustment of one or more of: the Long DRX cycle timer, i.e., the length of the long DRX cycle; the Short DRX cycle timer, i.e., the length of the short DRX cycle; the On-duration timer; the Inactivity Timer; the Retransmission timer; the HARQ RTT timer; the SR pending timer and the setting for a switch between long and short DRX cycle. The he adjustment of the DRX settings may alternatively or in addition involve adjustment of a timer associated with a time period from the first time instant when the mobile terminal can, in theory, receive an uplink grant, to a time when the terminal is anticipated to actually, in practice, receive the grant message on a control channel, which time period depends on the system load and/or the scheduling priority for the mobile terminal.

The DRX settings may be adjusted, in relation to current DRX settings, such that the mobile terminal spends more time in an inactive state when the fulfilled criterion is associated with a relatively longer waiting time, and such that the mobile terminal spends more time in an active state when the fulfilled criterion is associated with a relatively shorter waiting time. The scheduling priority associated with the mobile terminal may be determined based on at least one a Quality of Service Class Identifier (QCI) and/or an Allocation Retention and Priority (ARP) value.

The load level may be determined base on at least one of: a number of available physical resource blocks (PRBs); available control channel resources; number of PDCCH grants; number of available PUCCH resources, and a Signal to Interference and Noise Ratio. The network node may be a radio base station serving the mobile terminal, in which case the adjusted DRX settings may be signaled to the mobile terminal. The network node could alternatively be the mobile terminal, in which case information related to the scheduling priority associated with the mobile terminal and/or the load level of the cell associated with the mobile terminal may be received from a serving network node, and the scheduling priority associated with the mobile terminal and/or the load level of the cell associated with the mobile terminal may be determined based on said information.

Further, when the network node is a mobile terminal, the determining of the load level of the cell associated with the mobile terminal may be determined based on a time interval elapsed between a request for transmission resources until a resource assignment related to said request is received from a serving network node. Further, a set of candidate DRX settings may be received from a serving network node, and a DRX setting may be selected from the set, based on the scheduling priority associated with the mobile terminal and/or the load level of the cell associated with the mobile terminal. The adjusting of the DRX settings of the mobile terminal may then be based on the selected DRX settings.

The embodiments above have mainly been described in terms of a method. However, the description above is also intended to embrace embodiments of the arrangement, adapted to enable the performance of the above described features. The different features of the exemplary embodiments above may be combined in different ways according to need, requirements or preference.

An addition method and arrangement is provided, for the case when the network node described above is a mobile terminal:

According to a third aspect a method is provided in a network node for enabling reduced battery consumption in a mobile terminal served by the network node. The method comprises determining a set of candidate DRX settings for mobile terminal DRX setting adjustment, based on conditions associated with different load levels and/or different scheduling priorities. The set of candidate DRX settings are then signaled to the mobile terminal.

According to a fourth aspect, an arrangement is provided in a network node for enabling reduced battery consumption in a mobile terminal served by the network node. The arrangement comprises a determining unit, adapted to determine a set of candidate DRX settings, based on conditions associated with different load levels and/or different scheduling priorities. The arrangement further comprises a signaling unit, adapted to signal the set of candidate DRX settings to the mobile terminal.

The above method and arrangement according to the third and fourth aspect enable the mobile terminal to select a DRX setting from the set based on a scheduling priority associated with the mobile terminal and/or a load level of the cell associated with the mobile terminal. This, in turn, enable reduced battery consumption in the mobile terminal, which leads to prolonged battery lifetime. Further, the suggested technology enables differentiated power consumption for different services.

BRIEF DESCRIPTION OF THE DRAWINGS

The invention will now be described in more detail by means of exemplifying embodiments and with reference to the accompanying drawings, in which.

DETAILED DESCRIPTION

Figure 1:
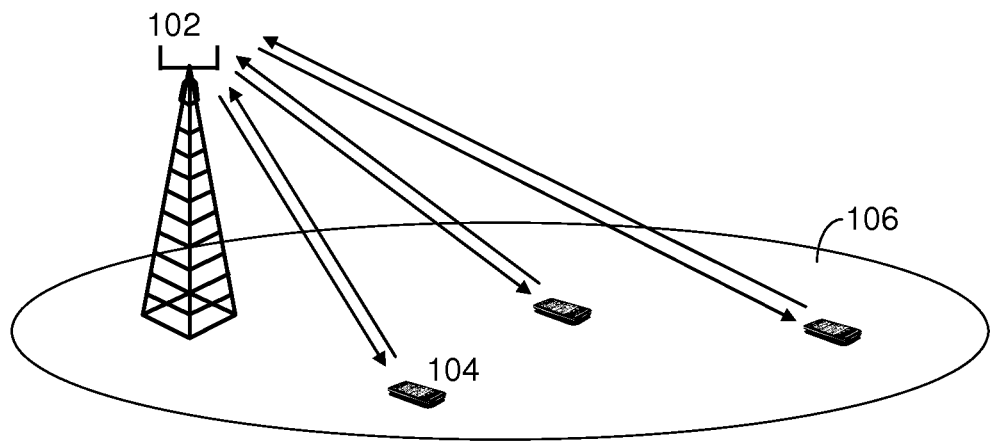
FIG. 1 shows a part of a wireless communication system in which the invention may be applied.
Figure 2:
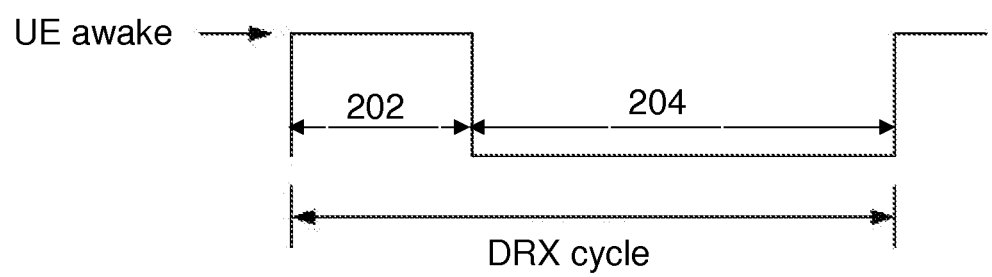
FIG. 2 shows an active and an inactive period of an exemplifying DRX cycle.

Various embodiments of the present invention are now described. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details.

Note that although terminology from 3GPP LTE has been used in this disclosure to exemplify the invention, this should not be seen as limiting the scope of the invention to only the aforementioned system. Other wireless systems including or adapted to include DRX techniques may also benefit from exploiting the ideas covered within this disclosure.

Also note that terminology such as base station and UE should be considered non-limiting as applied to the principles of the invention. Thus, in general, the RBS, e.g. eNB, in the discussion that follows may be considered more generically as "device 1" and the mobile station or UE considered as "device 2," in some circumstances, with these two devices comprising communication nodes communicating with each other over a radio channel.

Conventionally, DRX settings are typically static at the cell level. As previously described, in LTE standards to date, the DRX short cycle is triggered based on the data activity in either the uplink (UL) or downlink (DL) for a given UE. For example, when there is data waiting for transmission to or from a UE (currently applying DRX long cycle), the DRX short cycle is triggered, or the UE enters active mode However, which has been identified by the applicant, the fact that a UE has data waiting for transmission in the UL or DL does not necessarily mean that the UE can immediately start to transmit or receive said data. In order to transmit or receive data, the UE needs permission, typically in form of a scheduling assignment. Thus, as identified by the applicant, battery resources may be wasted when UEs applying short DRX cycle or having entered active state, still have to wait considerable time before receiving a scheduling assignment.

In LTE, the permissions, or grants, for a UE to transfer or receive data is controlled by the RBS. A UE is allowed to start the data transfer or prepare for the data reception only when the UE receives the related scheduling assignments. The scheduler assigns resources to users based on the scheduling priorities, and the available system resources. The scheduling priorities are typically defined based on the QoS Class Identifier (QCI), or the Allocation Retention and Priority (ARP) priority between users. For example, a bearer carrying delay sensitive traffic usually has higher priorities than bearers carrying delay insensitive traffic. Depending on the applied scheduling policies, the packet delay, and the radio channel quality, or the bit rate could be also considered. If multiple traffic types are carried in the same bearer, then the scheduling priorities might be determined based on DPI (deep packet inspection).

As previously mentioned, scheduling assignments may also be allocated based on the available system resources. Users with low scheduling priorities have to wait until the users with higher priorities get assignments. They could wait many TTIs before being scheduled, especially when the system is highly loaded. Hence, it is not very efficient for such users (applying long DRX cycle) with lower priorities to trigger short DRX cycle or enter into active state. When the system is highly loaded, even the users with higher priorities may have to wait considerable time for scheduling assignments, and could therefore, as observed by the applicant, have a longer DRX cycle than with the current settings, e.g. for the short DRX cycle.

In short, in this disclosure, an improved DRX functionality is suggested, which involves adapting DRX cycle settings based on UE scheduling priorities and/or the system load. For example, increasing DRX cycle timers or applying long DRX cycle more frequently could achieve reduced UE power consumption, and also improve system performance.

Herein, it has been focused on two different input parameters, based on which the DRX settings may be adapted, namely the user scheduling priority and the system, or cell, load. The DRX settings may be adapted based on one or both of these parameters. The scheduling priority could e.g. be defined as the QCI, or ARP priority directly, or it could be calculated as a weight by considering e.g. the QCI, or ARP priority; packet delay; bit rate; and/or radio channel quality. Since the scheduling priority is calculated per user, the adaptive DRX settings could be configured for users individually. Alternatively, or in addition, adaptive DRX settings can be configured for a group of users, or an entire cell, based on combined user priority information.

The system load is determined at cell level, and could be reflected e.g. by the number of available physical resource blocks (PRBs); the number of available control channel resources, e.g., number of PDCCH grants or number of available PUCCH resources, or even by a SINR (Signal to Interference and Noise Ratio) in a cell. The system load indicates the amount of resources that are available for a transmission.

In other words, users with lower scheduling priorities and/or users that are scheduled when system load is high will be assigned longer DRX cycle timers, or will apply only long DRX cycle without short DRX cycle, or both. Since both scheduling priorities and system load will vary over time, when the scheduling priorities become higher or the system load is lower than the predefined threshold, users will update DRX settings, with shorter DRX cycle timers, or apply short DRX cycle together with long DRX cycle, or both.

Figure 3:
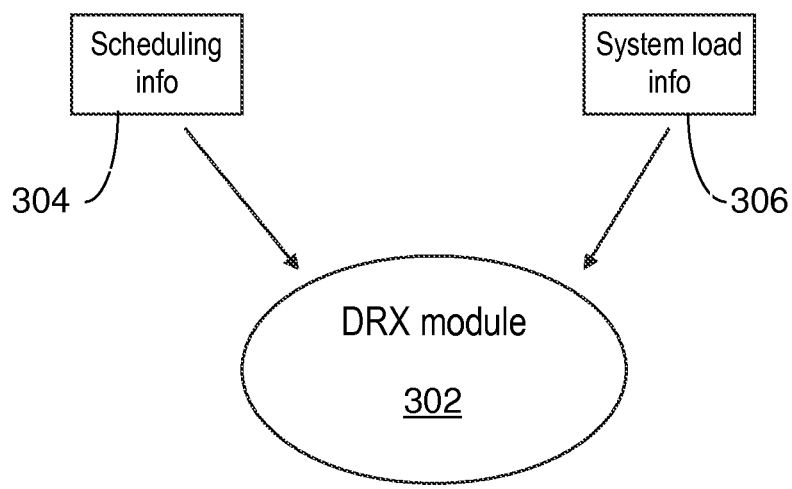
FIG. 3 shows a schematic view of a DRX module according to an exemplifying embodiment, and the input to the DRX module.

FIG. 3 shows a schematic illustration of a DRX module 302, responsible for adapting the DRX settings to current conditions based on information 304 related to scheduling priorities and/or information 306 on the system load. It is assumed that scheduling priorities and system load are provided or made available to the DRX module 302. The DRX module of FIG. 3 receives and evaluates the inputs of the scheduling priorities and system load. If the inputs satisfy a given criterion, the DRX module updates the DRX settings. These updated settings are then sent to the UE, e.g., by Radio Resource Control (RRC) signaling messages.

In the discussion above, DRX adaptation based on scheduling priorities and/or system load is performed in the base station, or e.g. elsewhere in the core network. Alternatively, DRX adaptation according to these or similar techniques can be performed in the UE. These different approaches can be regarded as the "RBS-centric alternative" and the "UE-centric alternative," respectively. These alternative implementations will be further described below.

RBS Centric

A DRX module located at the RBS side, e.g. in an eNB, may obtain information of scheduling priorities and/or measured system load from other entities within the RBS, such as e.g. from the scheduler, since this information is available within an RBS. If the obtained information satisfies a predefined criterion, the DRX module 302 updates the DRX settings for a UE, and informs the UE about the updated settings, e.g. by use of RRC signaling messages. In the RBS centric solution, the RBS controls the procedure, and decides when updated DRX settings should be applied for a particular UE, and further decides how the DRX settings should be updated.

An exemplifying procedure in an RBS centric implementation could be described as follows:

1. DRX module monitors both the scheduling info and the system load info
2. When determined by the DRX module that a parameter indicated by the monitored info is over a predefined threshold for a UE, e.g. when the user has low priority for scheduling and/or when the system is highly loaded, the DRX module determines new appropriate DRX settings.
3. The UE is informed of the determined settings by RRC signaling.

Figure 4A:
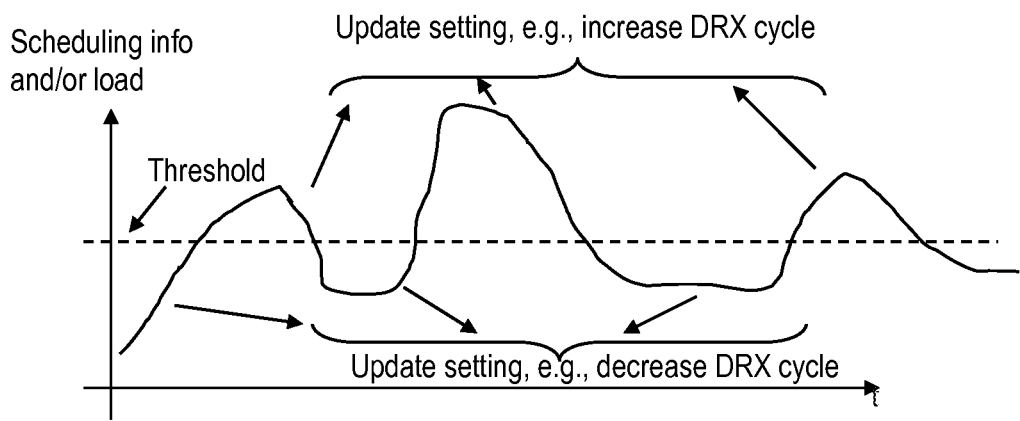
FIG. 4a illustrates variations related to scheduling priorities and/or load over time, and an exemplifying threshold used for decisions related to adjustment of DRX settings, according to an exemplifying embodiment.

FIG. 4a illustrates an example scenario in which the scheduling priorities for a given UE, the load information for the cell/RBS, or both, vary over time. As can be seen from the figure, when the evaluation of the information meets a predefined criteria (illustrated here as exceeding a threshold), the DRX settings are updated. As will be discussed in further detail below, this updating of the DRX settings can include e.g. one or more of increasing the DRX cycle time for the long DRX cycle, increasing the DRX cycle time for the short DRX cycle, decreasing the on-duration timer, adjusting the switching point between the long DRX cycle and the short DRX cycle, etc.

UE Centric

When an RBS decides to change the DRX settings of a UE based on information on the system load and/or scheduling information of a UE, the RBS may send the updated settings to the UE using an RRC signaling message, e.g., a radio link reconfiguration message. This can save UE battery. However, the frequent update messages may create a high signaling overhead. To reduce the signaling overhead, a UE centric solution may be used. In such a UE centric alternative, the RBS may propose a number of DRX settings, which correspond to different system load levels and/or different scheduling priorities. For example, such DRX settings could be notified to a terminal when the terminal sets up a bearer using RRC signaling messages. When to use the UE centric and when to use the network or RBS centric alternative could be controlled by the RBS, e.g. eNB. The alternative selected by the RBS could be signaled to the UE e.g. by use of an RRC signaling message, such as the radio link reconfiguration message.

Then a UE may, e.g. upon an order from the RBS, apply adequate DRX settings based on determined system load and/or scheduling priorities. The UE may determine the load and/or scheduling priorities based on measurements of the delay between the time instant when the UE transmits a SR and the time instant when UE receives the resource assignment associated with said SR. If this delay indicates a high system load, the DRX settings related to a high load should be applied. If the delay indicates a low or medium load, the corresponding settings should be applied.

Figures 4B, 5:
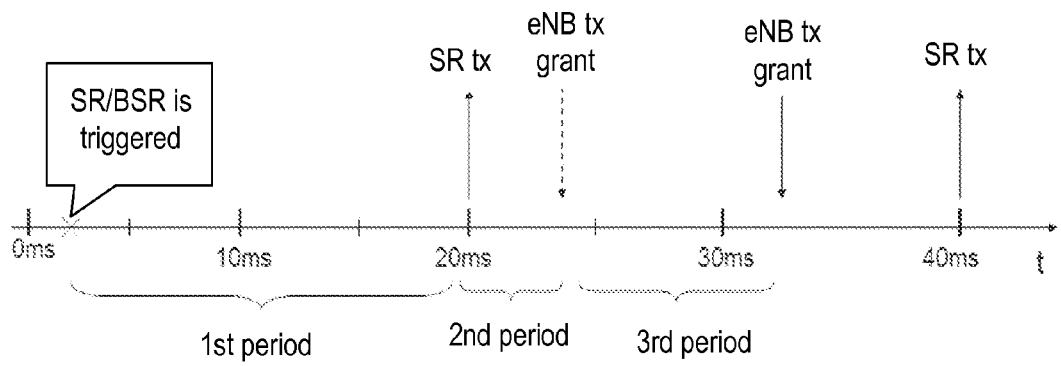
FIG. 4b illustrates an exemplifying set of candidate DRX settings, each having an associated decision criterion and an associated anticipated waiting time, according to an exemplifying embodiment.
FIG. 5 illustrates different time periods associated with scheduling requests.

As described above, the serving RBS may recommend, or provide, a number of candidate DRX settings that could be selected by UE, or one or more ranges of settings that can be selected by UE. An example of such a set of candidate DRX settings is illustrated in FIG. 4b. In the example illustrated in FIG. 4b, each candidate DRX setting is associated with a criterion and an anticipated waiting time The UE may select DRX settings from these possible candidate DRX settings based on the system load and/or scheduling priority situation.

For example, the recommended candidate DRX settings may be derived by an RBS based on the current scheduling priority of the UE. The UE may then select DRX settings from the set of candidate DRX settings based on the system load situation. In more detail, the UE may select a conservative DRX setting, e.g., in form of an extended DRX cycle, or, a more frequent use of long DRX cycle, in case the expected time before the UE will receive a scheduling assignment is long. Alternatively, the UE may select an aggressive setting, e.g., in form of a shortened DRX cycle, in case the expected time before the UE will receive a scheduling assignment is short, which may be expected e.g. when the system is lightly loaded. "Long" and "short" should here be interpreted as relative terms, where "long" is assumed to be longer than "short". Long and short could be assigned different (e.g. numerical) values by different operators, and different values may be assigned for different categories of users or services. The setting of decision criteria, such as thresholds, based on which it may be determined whether the DRX settings should be adapted or not may be determined by the operator based e.g. on results of simulations.

One or several metrics can be "learned" by the UE from historical statistics, and used by the UE to determine which DRX settings that should be selected. One such metric is the delay between the time instant when UE first transmits a scheduling request (SR) and the time instant when the UE gets the assignment, evaluated over a particular time period. This metric can be used to reflect the uplink load situation. Another metric is the delay between two consecutive scheduling assignments for the downlink. If either or both metrics are over the given threshold, UE can determine whether the cell is highly loaded or lowly loaded, then select the appropriate DRX settings, e.g. from a set of candidate DRX settings provided by the RBS.

This alternative is more driven by UE, and may thus involve less signaling overhead, as compared to the RBS centric implementation.

Examples of Adaptive DRX Settings

It should be noted, that when discussing adjustment or adaptation of DRX settings within this disclosure, it is not a conventional transition between conventional long DRX cycle and conventional short DRX cycle that is meant. By "conventional" is meant e.g. according to the current specifications.

In either of the RBS-centric or UE-centric approaches described above, a wide range of DRX settings may be adaptive responsive to priority information, system loading information, or both. In some embodiments, only one of these settings are adapted, while in others several settings are adapted. In some cases, two or more settings may be adjusted simultaneously, based on a given criteria, while in others, different settings are adjusted at different times, based on different criteria (e.g., different thresholds).

The different DRX settings which could be adaptively configurable could include one or more of the settings below, but is not limited to these examples.

Long DRX cycle timer, i.e., the length of the long DRX cycle

Short DRX cycle timer, i.e., the length of the short DRX cycle

On-duration timer

Inactivity Timer

Retransmission timer

HARQ RTT timer

SR pending timer, i.e., the time period from when user sends a SR until the time instant when user gets the resource assignment. During this time period, user has to be awake.

The setting for switch between long and short DRX cycle, i.e., the settings could be defined based on the data activity. For example, if the transmitted data volume fulfills a given threshold, then enable the short cycle. Otherwise, trigger the long cycle.

An example about how to adapt the DRX setting is clarified below.

When a high cell load is expected and a long waiting time before getting valid assignments for a UE is anticipated, DRX settings could be updated as one or more of:

1) Increased DRX cycle timers, including both long cycle and/or short DRX cycle.
2) Updated trigger criteria of the switch between the long DRX cycle and the short DRX cycle, for example, increase the threshold of the data volume based on which long cycle or short cycle should be triggered. Another alternative is to disable short DRX cycle and use the long DRX cycle only.
3) Involving a waiting time for the pending SR, such that, during that period, the PDCCH is not monitored. This length of the waiting time should be updated based on the system load.

Exemplifying Embodiment 1

Change DRX Cycle Timers Based on the Load

In this exemplifying embodiment, a scheduler evaluates the system, or cell, load based on the consumption of PRBs. When having a given system bandwidth, the total number of PRBs per cell is specified. The specified total number of PRBs per cell may be denoted e.g. PRBtot. The system load is evaluated according to the equation:

$$Load = PRBused/PRBtot \qquad (1)$$

Different load levels are defined, and a current load level could be determined by comparing a measured or estimated load with a number of predefined thresholds, $Lth_{low}$, $Lth_{medium}$, and $Lth_{high}$. A number of candidate DRX settings suitable for the different load levels could be recommended. For example, one or two DRX settings per load level could be recommended. To smooth the variation of a measured load, a filter may be used. In more detail, the system is considered as having a low load level, e.g. when the load value calculated using equation (1) is below the threshold $Lth_{low}$. When having determined that the system load is "low", a DRX setting adapted for low load will be applied. For example, the DRX settings: "Long_cycle_timerlow and Short_cycle_timer$_{low}$," could be applied. When the load value calculated using equation (1) exceeds the threshold $Lth_{medium}$ but is lower than the threshold $Lth_{high}$, the system is considered as having a medium load level. Then, the DRX settings: "Long_cycle_timer$_{medium}$ and Short_cycle_timer$_{medium}$" may be used. Correspondingly, if the calculated load level exceeds the threshold $Lth_{high}$, the system is considered as highly loaded. At high load level, it may be beneficial to apply DRX settings adapted for long waiting times, e.g. "Long_cycle_timer$_{high}$ and Short_cycle_timer$_{high}$.

When the system is determined to be highly loaded, another alternative is to apply only the long DRX cycle, e.g. by disabling the short cycle.

The system load may be measured or estimated based on the control channels. For example, the number of available PUCCH and PDCCH resource elements could be determined, e.g., the number of available control channel elements (CCEs). A similar methodology as the one described above may be used. By available is here meant the number of resources that are free for use, and not e.g. the total number of e.g. CCEs.

Whether to determine the system load based e.g. on the available (free for use) PRBs or available (free for use) CCEs could be dependent on the dominant traffic in the system. For example, low bit rate traffic, such as VoIP, is typically control channel limited. In this case, it could be better to measure the system load based on the CCEs. For high bit rate traffic, such as e.g. streaming of media, the system is typically PRB limited. Then, it could be a good idea to measure the system load based on PRB measurements.

Another possible way to select what to measure is to monitor both available PRBs and available CCEs, and use the measure that indicates the highest relative load. In more detail, e.g., if the ratio of used PRBs is higher than the ratio of used CCEs (with some margin to handle transient variations) then select the PRB measurements to determine the load for DRX setting selection.

Exemplifying Embodiment 2

Change DRX Cycle Timers Based on the Scheduling Information

In this exemplifying embodiment, the scheduling information is reflected by the scheduling weight, which is calculated by the scheduler, with the inputs of QCI (QoS Class Identifier), which reflects the priority of the bearer in RAB (Radio Access Bearer), and/or ARP priority (Allocation Retention and Priority), which is an indication of the preemption priority for the bearer when congestion occurs. The radio channel quality, e.g. represented by CQI and/or the packet delay could also be used as input to the scheduler. Depending on the scheduling scheme, other inputs could also be used, such as for example, the data rate during the recent TTIs could be used as input when a so-called proportional fair scheduling scheme is applied.

$$\text{Weight} = f(\text{scheduling scheme, QCI/ARP, CQI, delay, or data rate etc.}) \quad (2)$$

As in the exemplifying embodiment 1 described above, the scheduling weights calculated for a user may be filtered and compared with predefined thresholds, e.g. $\text{Wth}_{low}$, $\text{Wth}_{medium}$, and $\text{Wth}_{high}$. Correspondingly, a number of DRX settings adapted or configured for different weight levels are recommended. In more details, the user/UE is determined to have low scheduling priority when the weight calculated using equation (2) is below the threshold Wth1. At low scheduling priority, the DRX settings: "Long_cycle_timerlow and Short_cycle_timerlow" may be applied. For example in an RBS centric solution, the RBS may order the UE to apply the settings; and in a UE centric solution, the UE may select the settings from a set of candidates provided by the RBS. The DRX settings associated with low scheduling priority, and thus associated with longer waiting time before being scheduled, should have longer cycles and/or longer idle/inactive periods than DRX settings associated with a higher priority level.

When the calculated scheduling weights indicate that a UE has a higher scheduling priority, e.g. has a scheduling weight which is equal to or exceeds $\text{Wth}_{medium}$ (weight≥$\text{Wth}_{medium}$) or a scheduling weight which is equal to or exceeds $\text{Wth}_{high}$ (weight≥$\text{Wth}_{high}$), the RBS may order the UE to select the settings which have shorter cycles and/or shorter idle/inactive periods, since the corresponding users will have high priorities of being scheduled, and the waiting time is thus anticipated to be short (shorter than for users having lower priority).

Further, when the user has a low priority, another alternative is to apply the long DRX cycle only, e.g. by disabling the short cycle.

In the examples above, three different levels (low, medium and high) are defined. However, the number of different levels is not limited by this example. For example, more than three levels may be defined in order to enable adaptation options of finer granularity.

Embodiment 3

Add a Waiting Time Depending on the Load or the Scheduling Info for the Pending SR/BSR FIG. 5 illustrates the signaling procedure after a SR/BSR is triggered and pending. The procedure can be split into 3 different time periods. The first ($1^{st}$) time period refers to the period from the time when the SR or BSR is triggered to the first available time when the SR or BSR can be transmitted over the physical uplink control channel (PUCCH). The second ($2^{nd}$) time period refers to a period from the time when the SR or BSR is started to transmit over PUCCH to the first available time when the terminal can receive the uplink grant from the PDCCH channel. Typically, the second time period will be determined by the uplink and downlink round trip time for an SR or BSR transfer. The third ($3^{rd}$) period refers to the period from the first time instant when the terminal can, in theory, receive the uplink grant to the time when the terminal will actually, in practice, receive the grant message from the PDCCH channel. This period depends on the system load and/or the scheduling priority for the user. If the system is highly loaded, the third period could be quite long. According to the standard specified in [1], a UE has to listen to the PDCCH when a SR is pending until it is cancelled. Hence, according to current standard, the PDCCH will be monitored during all the three periods illustrated in FIG. 5. This is a waste of battery resources, since the UE will most probably not receive any relevant information during these periods.

In the work leading to this disclosure, it has been analyzed that the length of third period depends on the system load and/or the scheduling priorities of the users. If the system has low load, the length of the third period could be very short or even be zero. The user/UE could then get the UL grant at the first (theoretically) possible time instant. Similarly, if the user/UE has a high scheduling priority, the user/UE will get scheduled before other users/UEs having lower priorities. Then, the third period will also be relatively short. However, when the system has high load, and/or the user has low priority for scheduling, the length of the third period may be quite long. During this third time period, there is no need for the UE to listen to PDCCH. Hence, it is here proposed to involve an additional timer, which is associated with the third period. The length or runtime of such a timer should be set adaptively, e.g. based on information on, or measurements of, the system load and/or the user scheduling priority.

The settings of such a proposed timer may be determined in different ways. A very straightforward alternative is to set the timer based on historic data, e.g. statistics thereof. The RBS can e.g. determine one or more previous duration values of the third period. When using only historical data for setting the duration of the timer the system load or the scheduling weights do not need to be measured for this purpose.

Another alternative is to set the timer based on the measurement of the system load and/or the scheduling weight of the user. As for the embodiments described above, several different levels can be defined. For example, the levels: low load, medium load and high load can be defined for the system load; and/or the levels: low, medium and high priority can be defined for the scheduling weights. As a consequence, several different settings of the timer can be defined.

Within the period of this proposed timer, the terminal does not need to listen to PDCCH. Further, if there is no UL grants received when the timer expires, PDCCH shall not be monitored during the period from the time when the timer expires to the first possible time when the next SR can be transmitted over PUCCH.

In the above embodiments, the system load and/or the scheduling information can be measured or otherwise derived, e.g. simultaneously, and be used as input to a DRX module. For example, the DRX module could first determine, or identify, the system load, and then determine, or identify, the scheduling weights for the individual users/UEs. If the system, or cell, has high load, the same settings, e.g. involving longer DRX cycle timers, can be applied for all the users/UE in the system or cell, without further consideration of individual scheduling weights for the users/UEs. If the system has low or medium load, the DRX module can further consider the scheduling weights for the users/UEs when determining which DRX settings to apply. Users/UEs with higher scheduling priority can have different DRX settings than the DRX settings applied for other users with lower scheduling priority.

Figure 6:
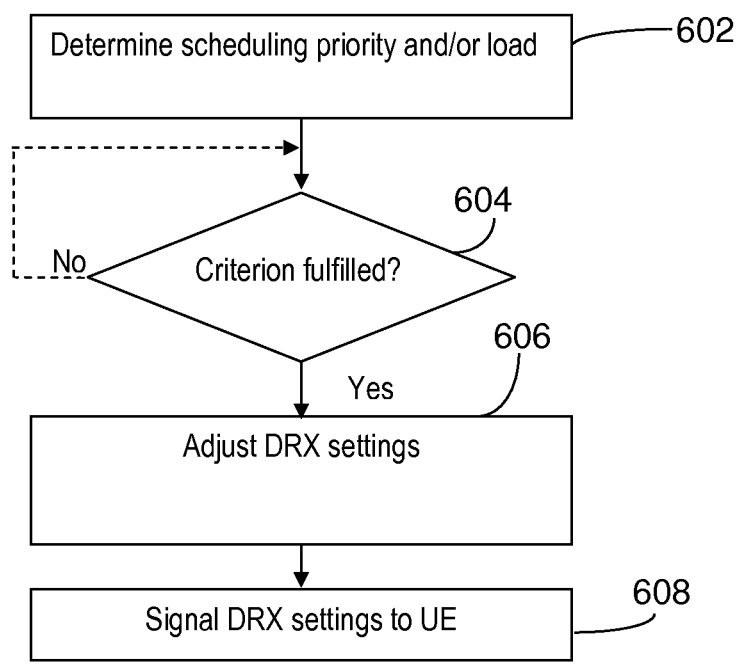
FIG. 6 is a flow chart illustrating a procedure in an RBS, according to an exemplifying embodiment.

Exemplifying Procedure, FIG. 6 (RBS Centric)

A procedure in an RBS, for enabling reduced battery consumption in a mobile terminal, is illustrated in FIG. 6. The RBS is assumed to be associated with a cell and to be serving one or more mobile terminals.

A cell load and/or scheduling priorities for the one or more mobile terminals served by the RBS are determined in an action 602. As previously described, the load could be determined e.g. based on the percentage of utilized PRBs and/or the percentage of utilized control channel resources. These two are just non-limiting examples of how to estimate the load. The scheduling priorities could be obtained, e.g. in form of scheduling weights, from the scheduler, which is located in the RBS. The scheduling priorities could alternatively be derived in another entity than the scheduler, using a similar algorithm as the scheduler and using the same type of input parameters as the scheduler. For example, QCI, ARP priority, packet delay, and/or data rate during the recent TTIs could be used as input.

When the cell load and/or scheduling priorities have been determined, it could be determined in an action 604, whether the DRX settings should be adjusted or not. This could be determined by determining whether one or more criteria are fulfilled, based on the determined cell load and/or scheduling priorities, where the one or more criteria are related to an anticipated waiting time before being scheduled. For example, the determining could involve comparison of load values and/or scheduling priority values with thresholds corresponding to different load categories and/or scheduling priority categories, such as e.g. "low", "medium", or "high" load, and "low", "medium", or "high" priority. Other granularities of categories are possible. For example, a certain combination of high cell load "Y" and low scheduling priority "Z" may be estimated or identified as being associated with an anticipated waiting time "t" of at least x ms. This combination of load and priority could then be defined as a criterion or threshold. For example, the criterion may be formulated as that the determined cell load "y" should exceed the load "Y" and the determined scheduling priority "z" should be below the priority "Z". When this criterion is fulfilled, DRX settings appropriate for the anticipated waiting time t should be applied (c.f. FIG. 4b).

Whether the DRX settings should be adjusted or not further depends on the current DRX settings. If the current DRX settings are appropriate for the current conditions regarding cell load and/or scheduling priorities, the settings do not need to be adjusted. For example, the current DRX settings could be compared with candidate DRX settings corresponding to a determined load level, and if there is a match, no change of DRX settings is executed. Alternatively, no such comparison is performed. If it is determined that the DRX settings should not be adjusted, the current DRX settings could continue to be used. This is illustrated as a dashed arrow from action 604 in FIG. 6.

If it is determined that the DRX settings should be adjusted, this is performed in an action 606. The DRX settings of one or more mobile terminals are adjusted, such that said settings are in accordance with the anticipated waiting time associated with the criterion. The DRX settings could be adjusted in a number of different ways, as previously described, e.g. by changing the length of the long or short DRX cycle, or the time within a cycle during which the receiver is active. Further, a new type of timer could be applied, which is associated with the time period (after an SR or BSR has been triggered) from the first time instant when the terminal can receive the uplink grant, to the time when the terminal may actually receive the grant message from the PDCCH channel. This time period is described as the third ($3_{rd}$) time period in FIG. 5. For example, an inactive DRX cycle period could be adjusted to correspond to said third time period, by adjusting the duration of such a new timer based on load level and/or scheduling priority.

The new DRX settings could then be signaled to the mobile terminal or terminals in question, e.g. via RRC signaling, in an action 608.

Figure 7:
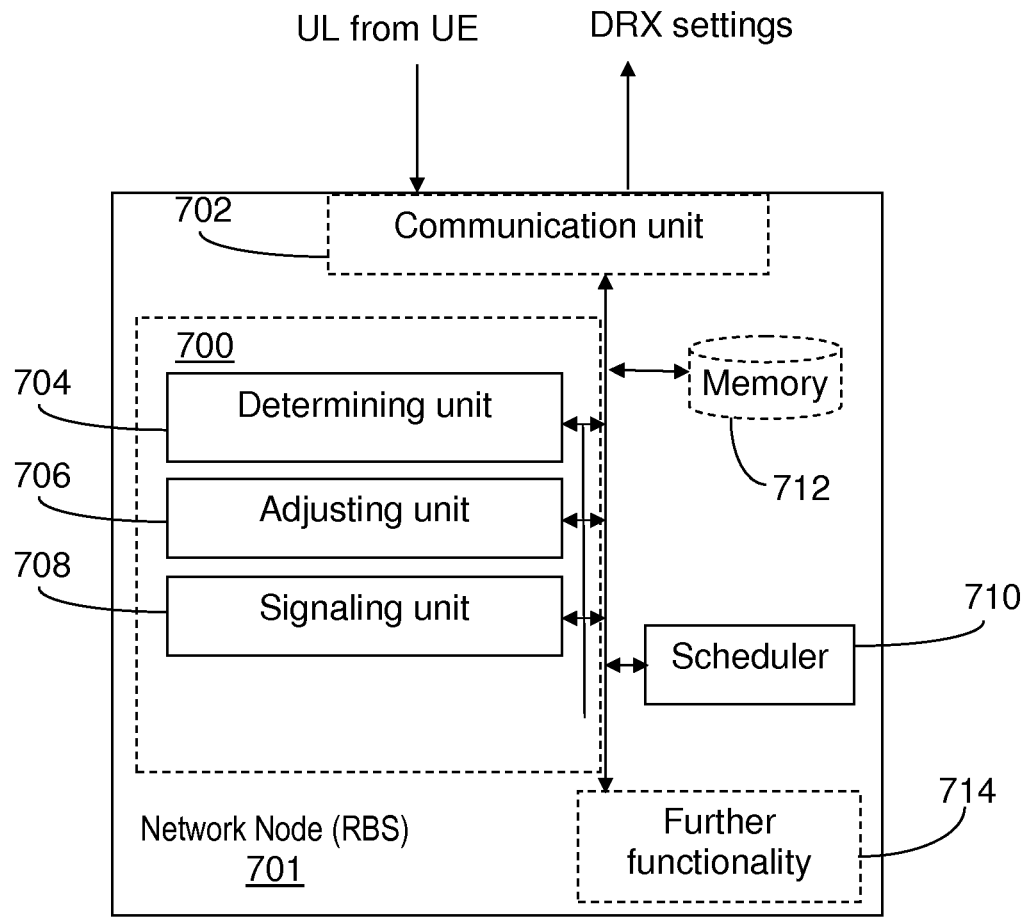
FIG. 7 is a block chart illustrating an arrangement in an RBS, according to an exemplifying embodiment

Exemplifying Network Node (RBS), FIG. 7 (RBS Centric)

Below, an exemplifying network node 701, adapted to enable the performance of the above described procedure will be described with reference to FIG. 7. The network node 701 is operable to serve one or more mobile terminals in a cell associated with the network node.

The network node 701 is illustrated as to communicate with other entities via a communication unit 702, which may be considered to comprise means for wireless (and possibly wired) uplink and downlink communication. Parts of the network node which are adapted to enable the performance of the above described procedure are illustrated as an arrangement 700, surrounded by a dashed line. This arrangement could be regarded e.g. as a "DRX module", as illustrated in FIG. 3. The network node 701 is further assumed to comprise a scheduler 710, which may provide information to the arrangement 700. Possibly, the scheduler 710 may be modified, as compared to a conventional scheduler, in order to provide information on scheduling priorities to the arrangement 700 in a preferred way. The arrangement and/or network node may further comprise other functional units 714, for providing e.g. regular node functions, such as serving mobile terminals. The arrangement and/or network node may further comprise one or more storage units 712.

The arrangement 700 could be implemented by processing circuitry, e.g. by one or more of: a processor or a micro processor and adequate software and storage therefore, a Programmable Logic Device (PLD) or other electronic component(s)/processing circuit(s) configured to perform the actions mentioned above in conjunction with FIG. 6.

The arrangement 700 may be implemented and/or described as follows: The arrangement 700 may comprise a determining unit 704, adapted to determine a scheduling priority associated with a mobile terminal and/or a load level of the cell associated with the mobile terminal. The determining unit 704 may further be adapted to determine whether a criterion is fulfilled, based on the determined scheduling priority and/or load level. The criterion, as described above, is associated with an anticipated waiting time until the mobile terminal is scheduled.

The arrangement 700 may further comprise an adjusting unit 706, adapted to, when a criterion is fulfilled, adjust the DRX settings of the mobile terminal, such that said settings are in accordance with the anticipated waiting time associated with the criterion. This may be done in a number of different ways, as described above. Thus, reduced battery consumption in the mobile terminal is enabled, due to that the DRX settings will be adjusted to actual current conditions.

The arrangement 700 may further comprise a signaling unit 708, adapted to signal the adjusted DRX settings, or any indication thereof, to the UE or UEs in question.

Figure 8:
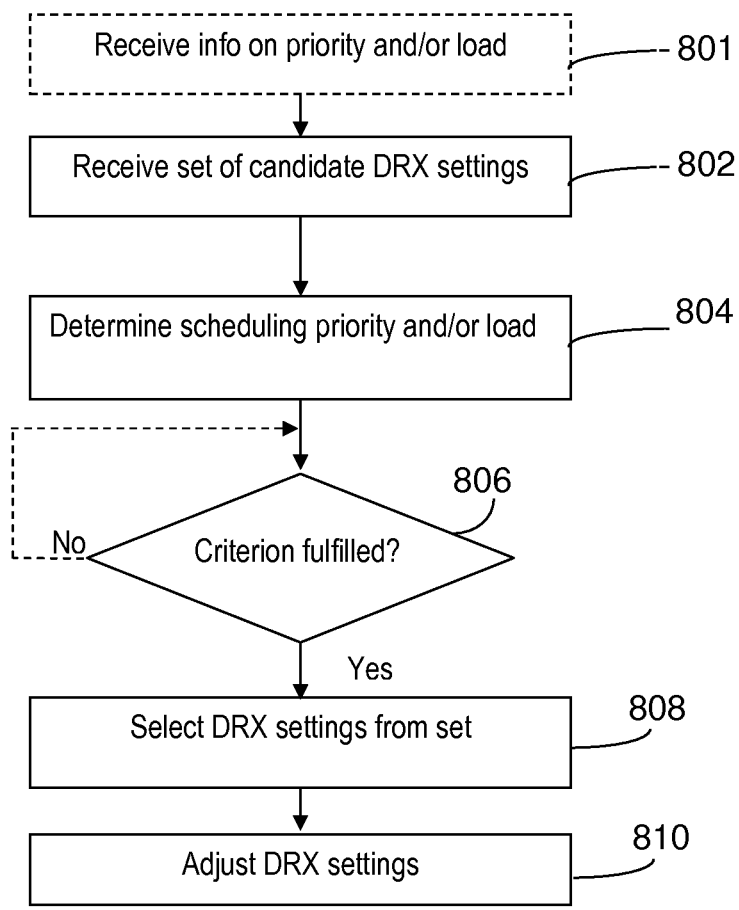
FIG. 8 is a flow chart illustrating a procedure in a mobile terminal, according to an exemplifying embodiment.

Exemplifying Procedure, FIG. 8 (UE Centric)

FIG. 8 illustrates a procedure in a mobile terminal, for enabling reduced battery consumption in the mobile terminal. The mobile terminal is assumed to be served by an RBS associated with a cell. Thus the mobile terminal is also associated with said cell. The procedure illustrated in FIG. 8 corresponds to a UE centric solution. The procedure illustrated in FIG. 8 has many similarities with the procedure illustrated in FIG. 6, but may involve some differences due e.g. to that a mobile terminal and an RBS do not necessarily have access to the same information. For example, the scheduler is typically located in the RBS and not in the mobile terminal.

A scheduling priority associated with the mobile terminal and/or a load level in the cell associated with the mobile terminal is determined in an action 804. This determining may be based on information on load level and/or scheduling priority received from the RBS. Such information may be received e.g. in an action 801. Alternatively, the determining may be based e.g. on measurements performed by the mobile terminal.

In a similar way as in the RBS centric solution, it is determined, in an action 806, whether a criterion is fulfilled. The determining is based on the determined scheduling priority and/or load level. The criterion may be of the same type as described above, and is associated with an anticipated waiting time until being scheduled (until the mobile terminal is scheduled). The criterion may in addition involve e.g. a comparison with current conditions, or use some other indicator of changed conditions, to determine whether adequate DRX settings are already applied.

When a criterion is fulfilled, thus indicating that the DRX settings should be adjusted, the DRX settings of the mobile terminal are adjusted, in an action 810, such that said settings are in accordance with the anticipated waiting time associated with the criterion. As described above, this may be achieved in a number of ways.

The mobile terminal should select appropriate DRX settings corresponding to the anticipated waiting time. For example, a set of candidate DRX settings, as the ones illustrated in FIG. 4b, corresponding to different load levels and/or scheduling priorities could be provided to the mobile terminal by the RBS serving the mobile terminal. The candidate DRX settings may each correspond to an anticipated waiting time, e.g. a time interval, before being scheduled. Such DRX settings could e.g. be received in an action 802. Then, DRX settings could be selected 808 from the set, based on the scheduling priority associated with the mobile terminal and/or the load level of the cell associated with the mobile terminal, (e.g. in form of the anticipated waiting time associated with a fulfilled criterion in action 806). The selecting of DRX settings could also be regarded as being integrated in action 806 or action 810. The adjusting of the DRX settings of the mobile terminal in action 810 is then performed based on the selected DRX settings.

Figure 9:
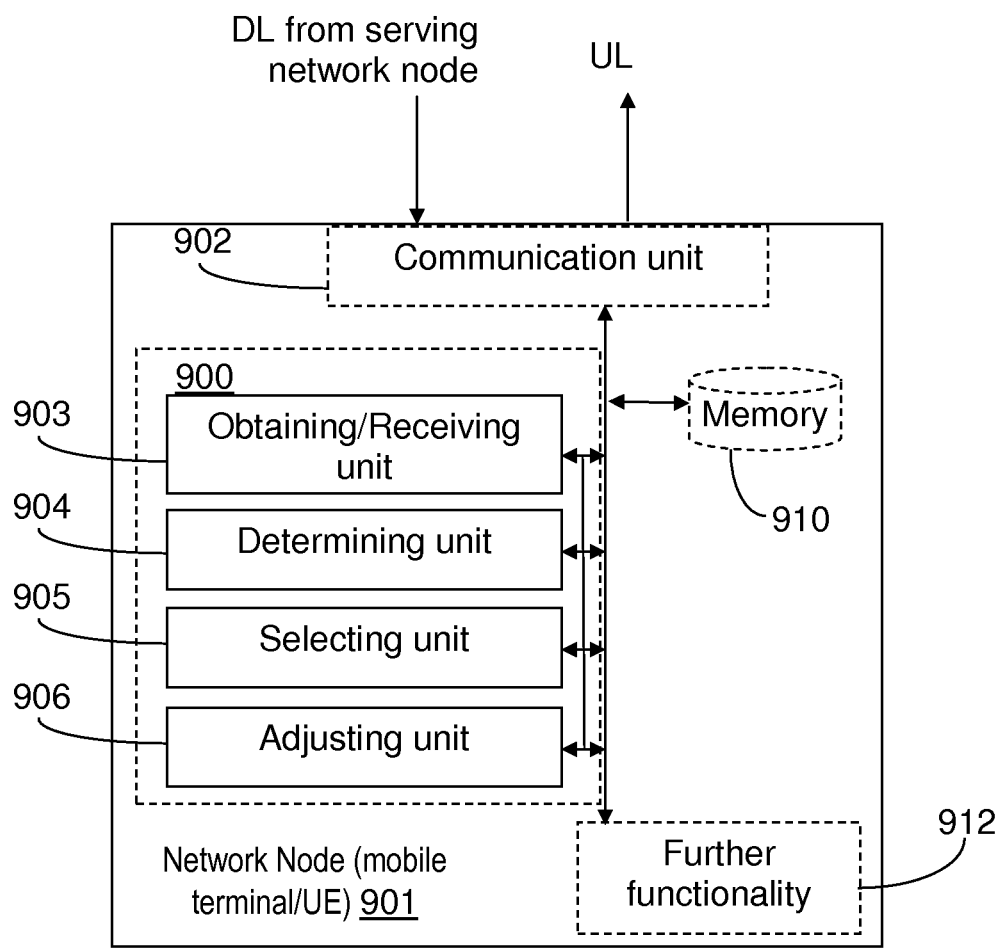
FIG. 9 is a block chart illustrating an arrangement in a mobile terminal, according to an exemplifying embodiment.

Exemplifying Network Node (Mobile Terminal), FIG. 9 (UE Centric)

Below, an exemplifying network node 901, in form of a mobile terminal, adapted to enable the performance of the above described procedure (UE centric) will be described with reference to FIG. 9. The mobile terminal 901 is operable to be served by an RBS associated with a cell. Thus the mobile terminal is operable to be associated with said cell.

The mobile terminal 901 is illustrated as to communicate with other entities via a communication unit 902, which may be considered to comprise means for wireless communication with a serving RBS. Parts of the mobile terminal which are adapted to enable the performance of the above described procedure are illustrated as an arrangement 900, surrounded by a dashed line. This arrangement could be regarded e.g. as a "DRX module", as illustrated in FIG. 3. The arrangement and/or mobile terminal may further comprise other functional units 912, for providing e.g. regular node functions. The arrangement and/or mobile terminal may further comprise one or more storage units 910.

The arrangement 900 could be implemented by processing circuitry, e.g. by one or more of: a processor or a micro processor and adequate software and storage therefore, a Programmable Logic Device (PLD) or other electronic component(s)/processing circuit(s) configured to perform the actions mentioned above in conjunction with FIG. 8.

The arrangement 900 may be implemented and/or described as follows: The arrangement 900 may comprise an obtaining unit 903, adapted to obtain information, e.g. by receiving information related to a scheduling priority associated with the mobile terminal and/or a level of the cell associated with the mobile terminal, from a serving network node. Further, a set of candidate DRX settings (for DRX setting adjustment) could be received from the serving network node.

The arrangement 900 comprises a determining unit 904, adapted to determine a scheduling priority associated with a mobile terminal and/or a load level of the cell associated with the mobile terminal. The determining may be based on information received from the serving network node and/or on measurements performed by the mobile terminal. The determining unit 904 may further be adapted to determine whether a criterion is fulfilled, based on the determined scheduling priority and/or load level. The criterion, as described above, is associated with an anticipated waiting time until the mobile terminal is scheduled.

The arrangement 900 may further comprise a selecting unit, 905, adapted to select a DRX setting from the set, based on the scheduling priority associated with the mobile terminal and/or the load level of the cell associated with the mobile terminal. The selecting unit could alternatively be an integrated part e.g. of either the determining unit 904 or an adjusting unit 906.

The arrangement 900 may further comprise an adjusting unit 906, adapted to, when the criterion is fulfilled, adjust the DRX settings of the mobile terminal, such that said settings are in accordance with the anticipated waiting time associated with the criterion. This may be done in a number of different ways, as described above. The adjusting of the DRX settings of the mobile terminal is based on the selected candidate DRX settings.

Thus reduced battery consumption in the mobile terminal is enabled, due to that the DRX settings will be adjusted to actual current conditions.

Figure 10:
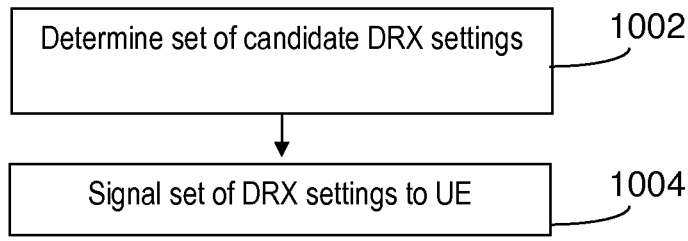
FIG. 10 is a flow chart illustrating a procedure in an RBS, according to an exemplifying embodiment.

Exemplifying Procedure, FIG. 10 (UE Centric)

In order to provide the mobile terminal with information for the UE centric DRX adjustment solution described above, certain actions need to be performed in the network node serving the mobile terminal. A procedure comprising such actions is illustrated in FIG. 10. First, a set of candidate DRX settings is determined in an action 1002. For example, the set may comprise DRX settings suitable for the different load levels "low", "medium" and "high" and/or different scheduling priorities. The set is then signaled to the mobile terminal in an action 1004, e.g. using RRC signaling.

It could be dynamically decided whether to use the RBS centric or the UE centric solution. Thus an RBS may be adapted to handle both the procedure for the RBS centric solution and the procedure for the UE centric solution.

Figure 11:
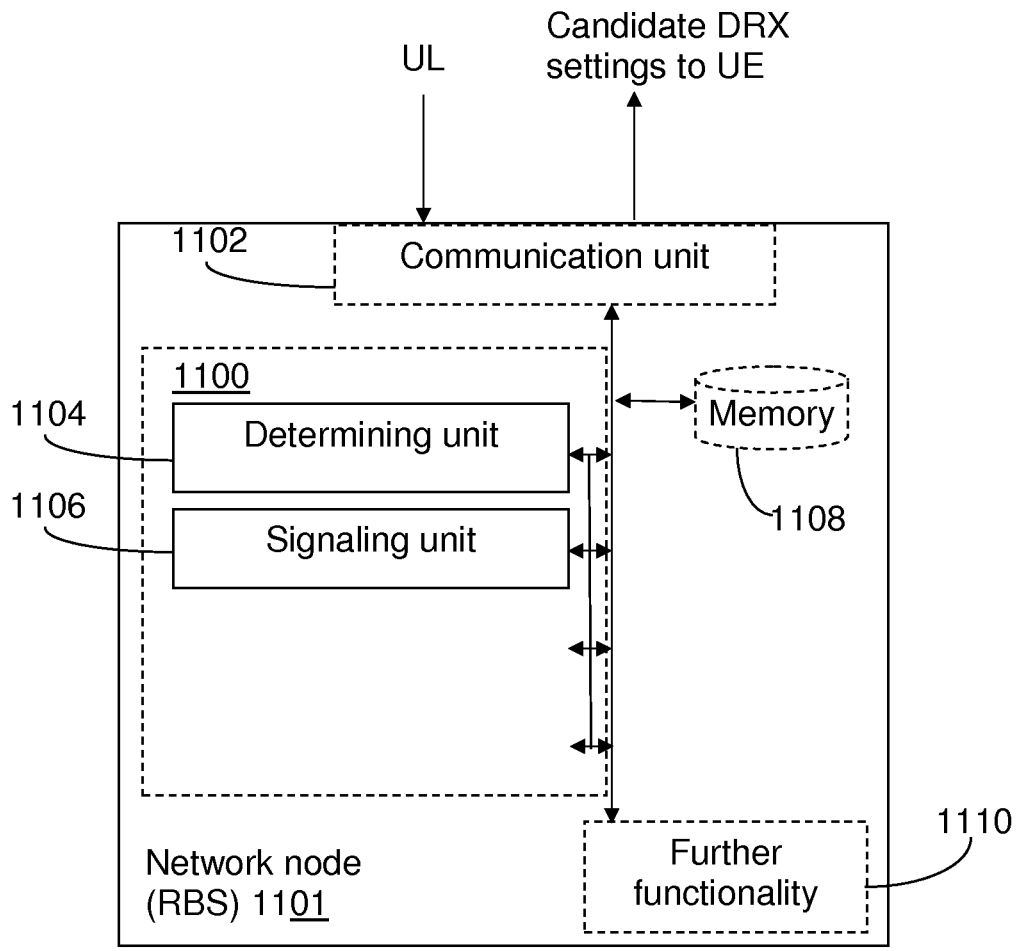
FIG. 11 is a block chart illustrating an arrangement in an RBS, according to an exemplifying embodiment.

Exemplifying Network Node (RBS), FIG. 11 (UE Centric)

Below, an exemplifying network node 1101, in form of an RBS, adapted to enable the performance of the above described procedure associated with a UE centric solution, will be described with reference to FIG. 11. The RBS 1101 is operable to serve one or more mobile terminals and to be associated with a cell.

The RBS 1101 is illustrated as to communicate with other entities via a communication unit 1102, which may be considered to comprise means for wireless communication with mobile terminals. Parts of the RBS which are adapted to enable the performance of the above described procedure (FIG. 10) are illustrated as an arrangement 1100, surrounded by a dashed line. This arrangement could be regarded e.g. as a "DRX support module". The arrangement and/or RBS may further comprise other functional units 1110, for providing e.g. remaining regular node functions and/or the units 704-710 described in conjunction with FIG. 7. The arrangement and/or RBS may further comprise one or more storage units 1108.

The arrangement 1100 could be implemented by processing circuitry, e.g. by one or more of: a processor or a micro processor and adequate software and storage therefore, a Programmable Logic Device (PLD) or other electronic component(s)/processing circuit(s) configured to perform the actions mentioned above in conjunction with FIG. 10.

The arrangement 1100 may be implemented and/or described as follows: The arrangement 1100 may comprise a determining unit 1104, adapted to determine a set of candidate DRX settings for mobile terminal DRX setting adjustment. The determining could be based on estimates and/or statistics of different cell loads and/or scheduling priorities, and the anticipated waiting times associated with said loads and/or priorities. Thus, candidate DRX settings which are adequate for the different estimates and/or statistics can be determined. The arrangement 1100 may further comprise a signaling unit 1106, adapted to signal the set of candidate DRX settings to the mobile terminal.

Figure 12:
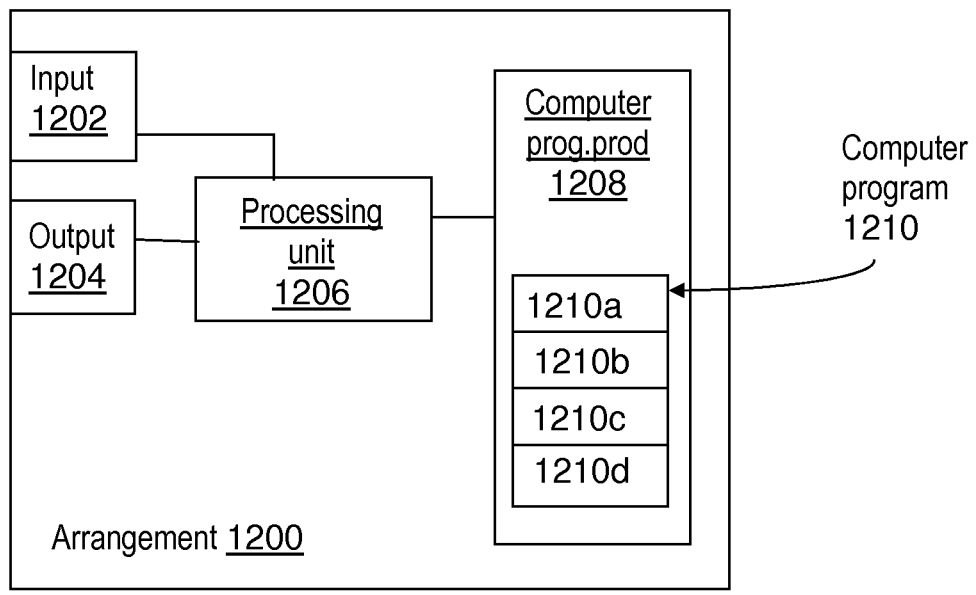
FIGS. 12 and 13 are block charts illustrating arrangements according to exemplifying embodiments.

Exemplifying Arrangement, FIG. 12

FIG. 12 schematically shows a possible embodiment of an arrangement 1200, which also can be an alternative way of disclosing an embodiment of the arrangement illustrated in any of FIG. 7 or 9. Comprised in the arrangement 1200 are here a processing unit 1206, e.g. with a DSP (Digital Signal Processor). The processing unit 1206 may be a single unit or a plurality of units to perform different actions of procedures described herein. The arrangement 1200 may also comprise an input unit 1202 for receiving signals from other entities, and an output unit 1204 for providing signal(s) to other entities. The input unit 1202 and the output unit 1204 may be arranged as an integrated entity.

Furthermore, the arrangement 1200 comprises at least one computer program product 1208 in the form of a non-volatile memory, e.g. an EEPROM (Electrically Erasable Programmable Read-Only Memory), a flash memory and a hard drive. The computer program product 1208 comprises a computer program 1210, which comprises code means, which when executed in the processing unit 1206 in the arrangement 1200 causes the arrangement and/or a node in which the arrangement is comprised to perform the actions e.g. of the procedure described earlier in conjunction with FIG. 6 or 8.

The computer program 1210 may be configured as a computer program code structured in computer program modules. Hence, in an exemplifying embodiment, the code means in the computer program 1210 of the arrangement 1200 may comprise a determining module 1210a for determining a scheduling priority for a UE and/or a load level of a cell; and further to determine whether a predetermined criterion is fulfilled based on the determined scheduling priority and/or load level. The arrangement 1200 may further comprise an adjusting module, for, when the criterion is fulfilled, adjusting the DRX settings of a mobile terminal, such that said settings are in accordance with an anticipated waiting time associated with the criterion.

Depending on whether the arrangement 1200 is to be located in an RBS or in a mobile terminal, the computer program may further comprise different modules, e.g. 1210c and 1210c. These modules could be e.g. for obtaining or signaling information or for selecting amongst a set of candidate DRX settings The modules 1210a-d could essentially perform the actions of the flow illustrated in FIG. 6 or 8, to emulate the arrangement illustrated in FIG. 7 or 9.

Although the code means in the embodiment disclosed above in conjunction with FIG. 12 are implemented as computer program modules which when executed in the processing unit causes the decoder to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

Figure 13:
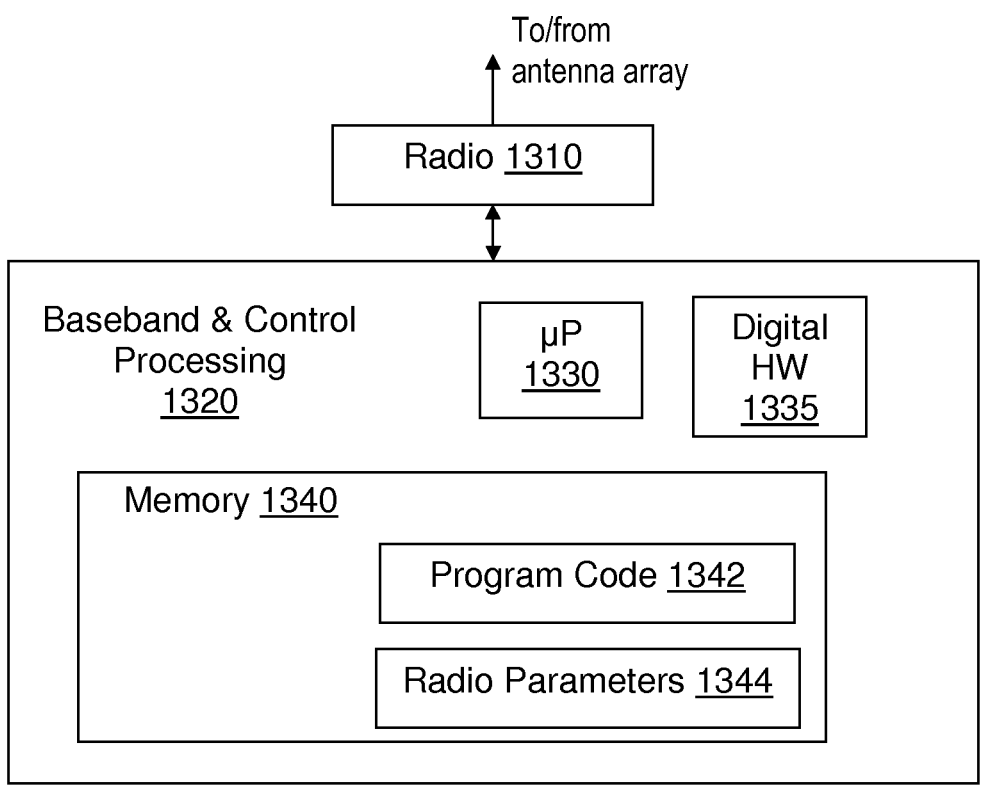

Those skilled in the art will appreciate that practical embodiments of the techniques described above will include control and signaling methods, practiced in an RBS, a mobile station, or both, as well as corresponding devices, including RBSs and mobile stations. In some cases, the methods/techniques described above will be implemented in a wireless transceiver apparatus such as the one pictured in FIG. 13, which illustrates a few of the components relevant to the present techniques, as realized in either a mobile station or a base station.

The pictured apparatus includes radio circuitry 1310 and baseband & control processing circuit 1320. Radio circuitry 1310 includes receiver circuits and transmitter circuits that use known radio processing and signal processing components and techniques, typically according to a particular telecommunications standard such as the 3GPP standard for LTE. Because the various details and engineering tradeoffs associated with the design of such circuitry are well known and are unnecessary to a full understanding of the invention, additional details are not shown here.

Baseband & control processing circuit 1320 includes one or more microprocessors or microcontrollers 1330, as well as other digital hardware 1335, which may include digital signal processors (DSPs), special-purpose digital logic, and the like. Either or both of microprocessor(s) 1330 and digital hardware may be configured to execute program code 1342 stored in memory 1340, along with radio parameters 1344. Again, because the various details and engineering tradeoffs associated with the design of baseband processing circuitry for mobile devices and wireless base stations are well known and are unnecessary to a full understanding of the invention, additional details are not shown here.

The program code 1342 stored in memory circuit 1340, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 1344 may include one or more predefined criteria (e.g., thresholds, rules, and the like) for use in evaluating UE priority information and/or system loading information.

In several RBS centric implementations according to the techniques described above, RBS control processing circuit 1320 is programmed with program instructions to create a DRX module like the one pictured in FIG. 3. This DRX module, as described earlier, receives priority information from a base station scheduler module (which may be implemented using the same control processing circuit 1320 or a physically distinct circuit, in various embodiments) as well as system loading information, evaluates the priority information and/or system loading information, and, based on this evaluation, adapts one or more DRX settings. The DRX module then causes a message reflecting the adapted setting(s) to be transmitted to one or more UEs, via radio circuits 1310.

Likewise, in several UE centric implementations according to the techniques described above, UE control processing circuit 1320 is programmed with program instructions to create a UE-based DRX module. This DRX module estimates or predicts system load information, based on, for example, historic information about system delays, and adapts one or more DRX settings based on this system loading information. In some embodiments, the adapted DRX setting or settings are selected from predefined alternatives or ranges; these alternatives or ranges may have been previously received from the network, e.g., via RRC signaling, in some embodiments. It will be appreciated that the UE-based DRX module may be part of or be closely coupled to a MAC control module, such as the MAC control element illustrated in FIG. 4.2.1-1 of 3GPP TS 36.321.

The above description of various embodiments of the present invention, while not limited to use in LTE systems, should be read and understood in the context of the existing 3GPP standards and revisions thereto, and should be understood to reflect adaptations of well-known physical structures and devices to carry out the described techniques.

Examples of several embodiments of the present invention have been described in detail above. Because it is not possible, of course, to describe every conceivable combination of components or techniques, those skilled in the art will appreciate that the present invention can be implemented in other ways than those specifically set forth herein, without departing from essential characteristics of the invention.

It is to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities. Although the description above contains many details, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

The invention claimed is:

1. A method, in a network node in a wireless communication system, for enabling reduced battery consumption in a first mobile terminal, the first mobile terminal being one of a plurality of mobile terminals in a cell of the wireless communication system, the method comprising:
   determining a scheduling priority associated with the first mobile terminal or a load level in the cell associated with the first mobile terminal, or both;
   determining whether a criterion is fulfilled based on the determined scheduling priority or load level, or both, where the criterion is associated with an anticipated waiting time until being scheduled; and
   if the criterion is fulfilled:
   adjusting the DRX settings of the first mobile terminal, such that said settings are in accordance with the anticipated waiting time associated with the criterion, thus enabling reduced battery consumption in the first mobile terminal, and wherein said settings are different from DRX settings applied to at least a second mobile terminal in the cell.

2. The method of claim 1, wherein the adjustment of the DRX settings involves adjustment of one or more of:
   a Long DRX cycle timer, i.e., the length of a long DRX cycle;
   a Short DRX cycle timer, i.e., the length of a short DRX cycle;
   an On-duration timer;

an Inactivity Timer;
a Retransmission timer;
a HARQ RTT timer;
a SR pending timer;
a setting for a switch between long and short DRX cycle.

3. The method of claim 1, wherein the adjustment of the DRX settings involves adjustment of a timer associated with a time period from the first time instant when the first mobile terminal can, in theory, receive an uplink grant, to a time when the first mobile terminal is anticipated to actually, in practice, receive the grant message on a control channel, which time period depends on the system load or the scheduling priority for the first mobile terminal, or both.

4. The method of claim 1, wherein the DRX settings are adjusted, in relation to current DRX settings, such that:
the first mobile terminal spends more time in an inactive state when the fulfilled criterion is associated with a relatively longer waiting time, and
the first mobile terminal spends more time in an active state when the fulfilled criterion is associated with a relatively shorter waiting time.

5. The method of claim 1, wherein the scheduling priority associated with the first mobile terminal is determined based on at least one of:
a Quality of Service Class Identifier (QCI),
an Allocation Retention and Priority (ARP) value.

6. The method of claim 1, wherein the load level is determined based on at least one of:
a number of available physical resource blocks (PRBs);
available control channel resources;
number of PDCCH grants;
number of available PUCCH resources; and
a Signal to Interference and Noise Ratio.

7. The method of claim 1, where the network node is a radio base station serving the first mobile terminal.

8. The method of claim 7, further comprising signaling the adjusted DRX settings to the first mobile terminal.

9. The method of claim 1, wherein the network node is the first mobile terminal.

10. The method of claim 9, further comprising:
receiving information related to the scheduling priority associated with the first mobile terminal or the load level of the cell associated with the first mobile terminal, or both, from a serving network node, and
wherein the determining of the scheduling priority associated with the first mobile terminal or the load level of the cell associated with the first mobile terminal, or both, is based on said information.

11. The method of claim 9, wherein the determining of the load level of the cell associated with the first mobile terminal is determined based on a time interval elapsed between a request for transmission resources until a resource assignment related to said request is received from a serving network node.

12. The method of claim 9, further comprising:
receiving a set of candidate DRX settings from a serving network node;
selecting a DRX setting from the set, based on the scheduling priority associated with the first mobile terminal or the load level of the cell associated with the first mobile terminal, or both; and
wherein the adjusting of the DRX settings of the first mobile terminal is based on the selected DRX settings.

13. An arrangement in a network node operable in a wireless communication system for enabling reduced battery consumption in a first mobile terminal, the first mobile terminal being one of a plurality of mobile terminals in a cell of the wireless communication system, the arrangement comprising processing circuitry adapted to:
determine a scheduling priority associated with the first mobile terminal or a load level of a cell associated with the first mobile terminal, or both;
determine whether a criterion is fulfilled based on the determined scheduling priority or load level, or both, where the criterion is associated with an anticipated waiting time until being scheduled; and
responsive to determining that the criterion is fulfilled, adjust the DRX settings of the first mobile terminal, such that said settings are in accordance with the anticipated waiting time associated with the criterion, and wherein said settings are different from the settings applied to at least a second mobile terminal in the cell,
thus enabling reduced battery consumption in the first mobile terminal.

14. The arrangement of claim 13, wherein the adjustment of the DRX settings involves adjustment of one or more of:
a Long DRX cycle timer, i.e., the length of a long DRX cycle;
a Short DRX cycle timer, i.e., the length of a short DRX cycle;
an On-duration timer;
an Inactivity Timer;
a Retransmission timer;
a HARQ RTT timer;
a SR pending timer; and
a setting for a switch between long and short DRX cycle.

15. The arrangement of claim 13, wherein the adjustment of the DRX settings involves adjustment of a timer associated with a time period from the first time instant when the first mobile terminal can, in theory, receive an uplink grant, to a time when the first mobile terminal is anticipated to actually, in practice, receive the grant message on a control channel, which time period depends on the system load or the scheduling priority for the first mobile terminal, or both.

16. The arrangement of claim 13, wherein the processing circuit is configured to adjust the DRX settings, in relation to current DRX settings, such that:
the first mobile terminal spends more time in an inactive state when the fulfilled criterion is associated with a relatively longer waiting time, and
the first mobile terminal spends more time in an active state when the fulfilled criterion is associated with a relatively shorter waiting time.

17. The arrangement of claim 13, wherein the processing circuit is configured to determine the scheduling priority associated with the first mobile terminal based on at least one of:
a Quality of Service Class Identifier (QCI); and
an Allocation Retention and Priority (ARP) value.

18. The arrangement of claim 13, wherein the processing circuit is configured to determine the load level based on at least one of:
a number of available or used physical resource blocks (PRBs), or both;
available or used control channel resources, or both;
a number of PDCCH grants;
a number of available or used PUCCH resources, or both; and
a Signal to Interference and Noise Ratio.

19. The arrangement of claim 13, where the network node is a radio base station operable to serve the first mobile terminal.

20. The arrangement of claim 19, further comprising a signaling circuit adapted to signal the adjusted DRX settings to the first mobile terminal.

21. The arrangement of claim 13, wherein the network node is the first mobile terminal.

22. The arrangement of claim 21, further comprising
a receiving circuit, adapted to receive information related to the scheduling priority associated with the first mobile terminal or the load level of the cell associated with the first mobile terminal, or both, from a serving network node; and
wherein the processing circuitry is further adapted to determine the scheduling priority associated with the first mobile terminal or the load level of the cell associated with the first mobile terminal, or both, based on said information.

23. The arrangement of claim 22, wherein the receiving circuit is further adapted to receive a set of candidate DRX settings from a serving network node, and wherein the processing circuit is adapted to:
select a DRX setting from the set, based on the scheduling priority associated with the first mobile terminal or the load level of the cell associated with the first mobile terminal, or both; and
adjust the DRX settings of the first mobile terminal is based on the selected DRX settings.

24. The arrangement of claim 21, wherein the determining of the load level of the cell associated with the first mobile terminal is determined based on a time interval elapsed between a request for transmission resources until a resource assignment related to said request is received from a serving network node.

25. A method in a network node for enabling reduced battery consumption in a mobile terminal served by the network node, the method comprising:
determining a set of candidate DRX settings for mobile terminal DRX setting adjustment, based on conditions associated with different load levels or different scheduling priorities, or both; and
signaling the set of candidate DRX settings to the mobile terminal;
thus enabling the mobile terminal to select a DRX setting from the set based on a scheduling priority associated with the mobile terminal or a load level of the cell associated with the mobile terminal, or both.

26. An arrangement in a network node for enabling reduced battery consumption in a mobile terminal served by the network node, the arrangement comprising processing circuitry adapted to:
determine a set of candidate DRX settings, based on conditions associated with different load levels or different scheduling priorities, or both; and
signal the set of candidate DRX settings to the mobile terminal;
thus enabling the mobile terminal to select a DRX setting from the set based on a scheduling priority associated with the mobile terminal or a load level of the cell associated with the mobile terminal, or both.

27. A method, in a network node in a wireless communication system, for enabling reduced battery consumption in a first mobile terminal, the first mobile terminal being one of a plurality of mobile terminals in a cell of the wireless communication system, the method comprising:
determining a scheduling priority associated with the first mobile terminal;
determining whether a criterion is fulfilled based on the determined scheduling, where the criterion is associated with an anticipated waiting time until being scheduled; and
responsive to determining that the criterion is fulfilled, adjusting the DRX settings of the first mobile terminal, such that said settings are in accordance with the anticipated waiting time associated with the criterion, thus enabling reduced battery consumption in the first mobile terminal, and wherein said settings are different from DRX settings applied to at least a second mobile terminal in the cell.

* * * * *